United States Patent
Liang

(10) Patent No.: US 9,200,134 B2
(45) Date of Patent: Dec. 1, 2015

(54) COMPOSITION FOR FLEXIBLE SUBSTRATE AND FLEXIBLE SUBSTRATE

(71) Applicant: CHI MEI CORPORATION, Tainan (TW)

(72) Inventor: Yu-Hao Liang, Kaohsiung (TW)

(73) Assignee: CHI MEI CORPORATION, Tainan (TW)

(*) Notice: Subject to any disclaimer, the term of this patent is extended or adjusted under 35 U.S.C. 154(b) by 0 days.

(21) Appl. No.: 14/300,211

(22) Filed: Jun. 9, 2014

(65) Prior Publication Data
US 2014/0378588 A1    Dec. 25, 2014

(30) Foreign Application Priority Data

Jun. 21, 2013    (TW) .............................. 102122196 A

(51) Int. Cl.
| | | |
|---|---|---|
| *C08K 3/36* | (2006.01) | |
| *C08K 3/22* | (2006.01) | |
| *C08K 5/06* | (2006.01) | |
| *C08L 79/08* | (2006.01) | |
| *C09D 179/08* | (2006.01) | |
| *C08G 73/10* | (2006.01) | |
| *C08K 5/544* | (2006.01) | |

(52) U.S. Cl.
CPC ............ *C08K 3/36* (2013.01); *C08G 73/105* (2013.01); *C08G 73/1042* (2013.01); *C08G 73/1067* (2013.01); *C08G 73/1075* (2013.01); *C08G 73/1078* (2013.01); *C08K 3/22* (2013.01); *C08K 5/06* (2013.01); *C08K 5/544* (2013.01); *C08L 79/08* (2013.01); *C09D 179/08* (2013.01); *C08K 2003/2241* (2013.01); *C08K 2003/2244* (2013.01); *C08L 2205/025* (2013.01)

(58) Field of Classification Search
CPC ................................. C08L 79/08; C08K 3/36
USPC .......................................................... 524/588
See application file for complete search history.

(56) References Cited

U.S. PATENT DOCUMENTS

| | | | | |
|---|---|---|---|---|
| 4,853,452 | A * | 8/1989 | Lee ................. | 528/26 |
| 6,265,042 | B1 * | 7/2001 | Oka et al. ............ | 428/40.1 |

FOREIGN PATENT DOCUMENTS

| | | |
|---|---|---|
| CN | 101805517 A | 8/2010 |
| TW | 459156 | 10/2001 |
| TW | 201247403 A1 | 12/2012 |
| WO | 2009107429 A1 | 9/2009 |

* cited by examiner

*Primary Examiner* — Margaret Moore
(74) *Attorney, Agent, or Firm* — CKC & Partners Co., Ltd.

(57) ABSTRACT

The present invention relates to a composition for a flexible substrate having thermal yellowing resistance. The composition for the flexible substrate comprises a polymer (A), an inorganic oxide particle (B), a silane compound containing an amino group (C) and a solvent (D). The polymer (A) is selected from the group consisting of a polyamic acid resin, a polyimide resin and any combination thereof. The polymer (A) is obtained by reacting a mixture that includes a tetracarboxylic dianhydride component and a diamine component. In a preferred embodiment, the polyamic acid resin and polyimide resin are prepared from a bicyclic alicyclic tetracarboxylic dianhydride or a fluorine containing tetracarboxylic dianhydride compound. In another embodiment, a polydiorganosiloxane having from 2 to 11 Si atoms and having terminal amine groups is included in the composition.

5 Claims, No Drawings

COMPOSITION FOR FLEXIBLE SUBSTRATE AND FLEXIBLE SUBSTRATE

RELATED APPLICATIONS

This application claims priority to Taiwan Application Serial Number 102122196 filed Jun. 21, 2013, which is herein incorporated by reference.

BACKGROUND

1. Field of Invention

The present invention relates to a composition for a flexible substrate. More particularly, the present invention relates to a composition for a flexible substrate having anti-yellowing and heat-resistant properties and a flexible substrate formed by the same.

2. Description of Related Art

In recent years, organic polymers materials have been widely applied in various electrical elements or devices for increasing various properties (for example, electrical insulation, heat resistance, mechanical properties and so on). Among those polymers, polyimide polymer is the most commonly applied in related industries due to its excellently mechanical and electrical properties.

WO 2009/107429 discloses a polyimide precursor composition for transparent flexible substrate. The polyimide precursor is formed by reacting diamine (comprising fluorene-containing benzidine and 1,4-cyclohexyldiamine) and tetracarboxylic dianhydride. The aforementioned composition is used to form a flexible substrate with high transparency. However, during the process of heating the polyimide precursor, the cured and formed polyimide has yellowing problem under high temperatures so that such polyimide cannot satisfy the requirement of this industrial field.

Therefore, there is a need to provide a composition for a flexible substrate and flexible substrate, so as to improving the aforementioned disadvantages of the prior composition and flexible substrate.

SUMMARY

Accordingly, an aspect of the invention provides a composition for a flexible substrate, which comprises a polymer (A), an inorganic oxide particle (B), a silane compound containing an amino group (C) and a solvent (D). The composition for a flexible substrate can improve the thermal yellowing resistance.

Another aspect of the invention provides a flexible substrate formed by the aforementioned composition.

These and other features, aspects, and advantages of the present invention will become better understood with reference to the following description and appended claims.

According to the aforementioned aspects, the composition for the flexible substrate comprises a polymer (A), an inorganic oxide particle (B), a silane compound containing an amino group (C) and a solvent (D), each of which is described in detailed as below.

Polymer (A)

The polymer (A) is selected from the group consisting of a polyamic acid resin a polyimide resin and any combination thereof. The polymer (A) is obtained by reacting a mixture that includes a tetracarboxylic dianhydride component and a diamine component.

Tetra Carboxylic Dianhydride Component

The tetracarboxylic dianhydride component can be selected from the group consisting of a aliphatic tetracarboxylic dianhydride compound, an alicyclic tetracarboxylic dianhydride compound, an aromatic tetracarboxylic dianhydride compound, a tetracarboxylic dianhydride compound of formulas (II-1) to (II-6) and a fluorine-containing tetracarboxylic dianhydride compound.

Examples of the aliphatic tetracarboxylic dianhydride compound can include but be not limited to ethane-tetracarboxylic dianhydride or butane-tetracarboxylic dianhydride as the tetracarboxylic dianhydride components.

Examples of the alicyclic tetracarboxylic dianhydride compound can include but be not limited to 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dicholoro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutylcycleheptyl-1,5-diene-1,2,5,6-tetracarboxylic dianhydride, 2,3,5-tricarboxycyclopentyl acetic dianhydride or the like as the tetracarboxylic dianhydride components.

The alicyclic tetracarboxylic dianhydride compound further include a bicyclic alicyclic tetracarboxylic dianhydride compound. Preferably, the bicyclic alicyclic tetracarboxylic dianhydride compound has a tetravalent bridged hydrocarbon group with 7 to 9 of the total carbon atom number including one bridge having a carbon atom number of 1 or 2.

Examples of the bicyclic alicyclic tetracarboxylic dianhydride compound can include but be not limited to bicyclo[2.2.1]heptane-2,3,5,6-tetracarboxylic dianhydride, 7-azabicyclo[2.2.1]heptane-2,3,5,6-tetracarboxylic dianhydride, 7-oxabicyclo[2.2.1]heptane-2,3,5,6-tetracarboxylic dianhydride, 7-thiabicyclo[2.2.1]heptane-2,3,5,6-tetracarboxylic dianhydride, 6-carboxymethyl)-bicyclo[2.2.1]heptane-2,3,5-tricarboxylic-2,3,5,6-dianhydride, bicyclo[2.2.2]octane-2,3,5,6-tetracarboxylic dianhydride, bicyclo[2.2.2]oct-7-ene-2,3,5,6-tetracarboxylic dianhydride, bicyclo[2.2.2]oct-5-ene-1,2,7,8-tetracarboxylic dianhydride, bicyclo[2.2.2]oct-2-ene-2,3,5,6-tetracarboxylic dianhydride, 7-azabicyclo[2.2.2]octane-2,3,5,6-tetracarboxylic dianhydride, 7-oxabicyclo[2.2.2]octane-2,3,5,6-tetracarboxylic dianhydride, 7-thiabicyclo[2.2.2]octane-2,3,5,6-tetracarboxylic dianhydride, bicyclo[3.2.1]octane-2,3,5,6-tetracarboxylic dianhydride, bicyclo[3.2.1]octane-2,4,5,6-tetracarboxylic dianhydride, 7-azabicyclo[3.2.1]octane-2,3,5,6-tetracarboxylic dianhydride, 7-azabicyclo[3.2.1]octane-2,4,5,6-tetracarboxylic dianhydride, 7-oxabicyclo[3.2.1]octane-2,3,5,6-tetracarboxylic dianhydride, 7-oxabicyclo[3.2.1]octane-2,4,5,6-tetracarboxylic dianhydride, 7-thiabicyclo[3.2.1]octane-2,3,5,6-tetracarboxylic dianhydride, 7-thiabicyclo[3.2.1]octane-2,4,5,6-tetracarboxylic dianhydride, bicyclo[3.2.2]nonane-2,3,6,7-tetracarboxylic dianhydride, bicyclo[3.2.2]nonane-2,4,6,7-tetracarboxylic dianhydride, bicyclo[3.2.2]non-8-ene-2,3,6,7-tetracarboxylic dianhydride, bicyclo[3.2.2]non-8-ene-2,4,6,7-tetracarboxylic dianhydride, 8-azabicyclo[3.2.2]nonane-2,3,6,7-tetracarboxylic dianhydride, 8-azabicyclo[3.2.2]nonane-2,4,6,7-tetracarboxylic dianhydride, 8-oxabicyclo[3.2.2]nonane-2,3,6,7-tetracarboxylic dianhydride, 8-oxabicyclo[3.2.2]nonane-2,4,6,7-tetracarboxylic dianhydride, 8-thiabicyclo[3.2.2]nonane-2,3,6,7-tetracarboxylic dianhydride, 8-thiabicyclo[3.2.2]nonane-2,4,6,7-tetracarboxylic dianhydride or the like.

Examples of the aromatic tetracarboxylic dianhydride compound can include but be not limited to 3,4-dicarboxy-1,2,3,4-tetrahydronaphthalene-1-succinic acid dianhydride, pyromellitic dianhydride, 2,2',3,3'-benzophenonetetracarboxylic dianhydride, 3,3',4,4'-benzophenonetetracarboxylic dianhydride, 3,3',4,4'-diphenylsulfonetetracarboxylic dianhydride, 1,4,5,8-naphthalenetetracarboxylic dianhydride, 2,3,6,7-naphthalenetetracarboxylic dianhydride, 3,3'-4,4'-diphenylethanetetracarboxylic dianhydride, 3,3'-4,4'-dimethyldiphenylsilanetetracarboxylic dianhydride, 3,3',4,4'-tetraphenylsilanetetracarboxylic dianhydride, 1,2,3,4-furantetracarboxylic dianhydride, 2,3,3',4'-diphenyl ether tetracarboxylic dianhydride, 3,3',4,4'-diphenyl ether tetracarboxylic dianhydride, 4,4'-bis(3,4-dicarboxyphenoxy)diphenylsulfide dianhydride, 2,3,3',4'-diphenylsulfide dianhydride, 3,3',4,4'-diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, tetracarboxylic dianhydride, tetracarboxylic dianhydride, 3,3',4,4'-diphenyl tetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride, bis(triphenylphthalic acid)-4,4'-phenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride or the like.

The tetracarboxylic dianhydride component of formulas (II-1) to (II-6) is shown as below:

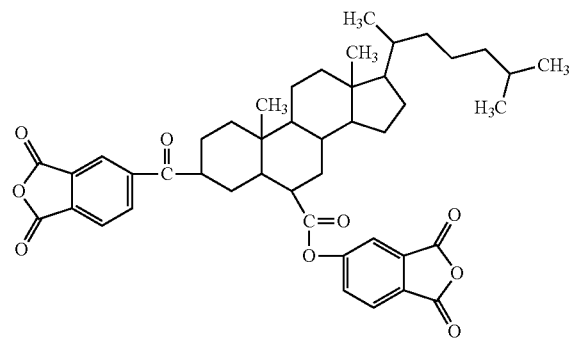

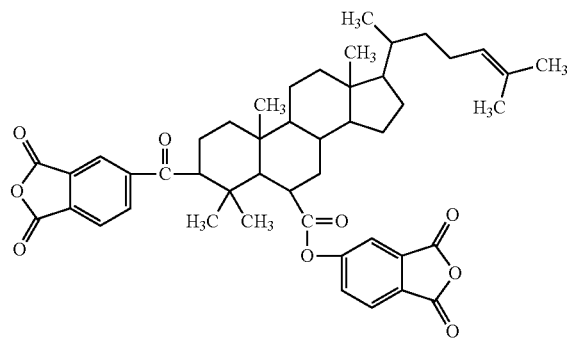

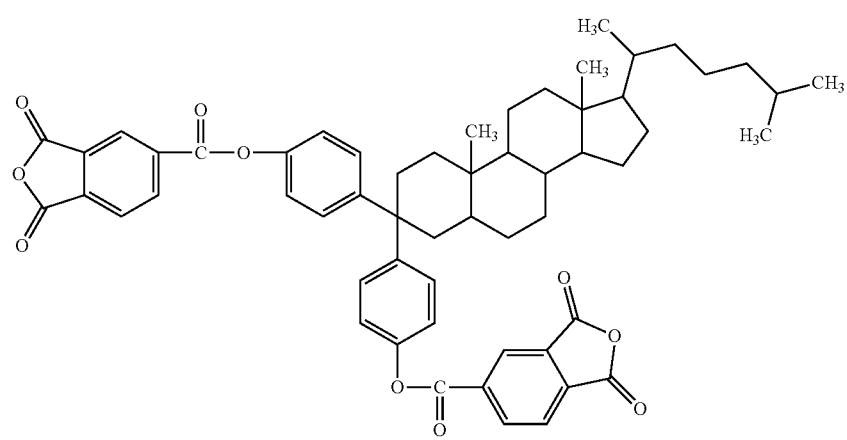

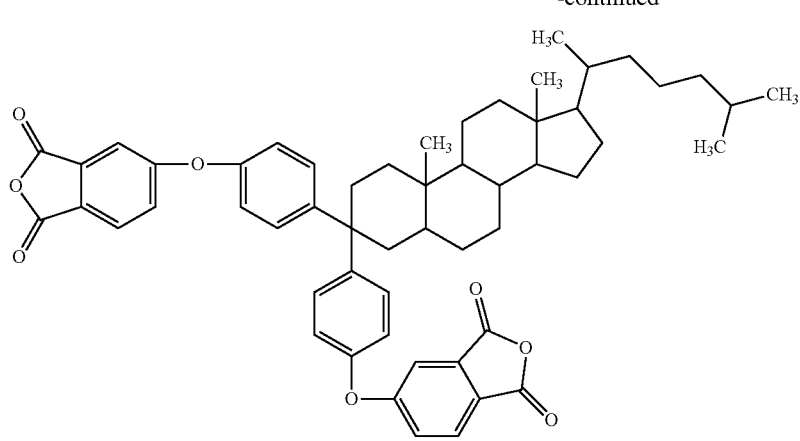
(II-4)

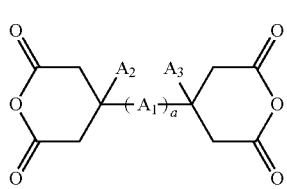
(II-5)

In the Formula (II-5), the $A_1$ represents a divalent group containing aromatic ring(s); the a represents an integer of 1 to 2; the $A_2$ and the $A_3$ can be the same or different and each of which independently represents hydrogen atom or alkyl group(s). Preferably, the tetracarboxylic dianhydride component of Formula (II-5) can be selected from the group consisting of the following compounds of Formulas (II-5-1) to (II-5-3):

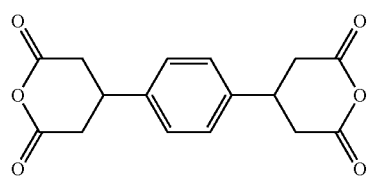
(II-5-1)

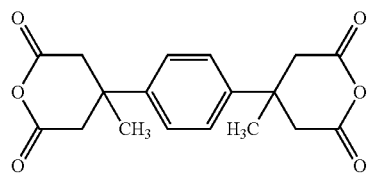
(II-5-2)

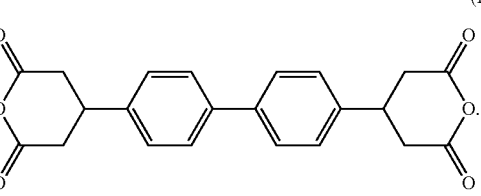
(II-5-3)

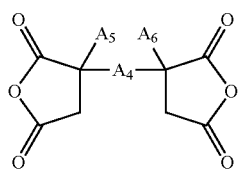
(II-6)

In Formula (II-6), the $A_4$ represents a divalent group containing aromatic ring(s); the $A_5$ and the $A_6$ can be the same or different and each of which independently represents hydrogen atom or alkyl group(s). Preferably, the tetracarboxylic dianhydride component of Formula (II-6) can be further selected from the group consisting of the following compound of Formula (II-6-1):

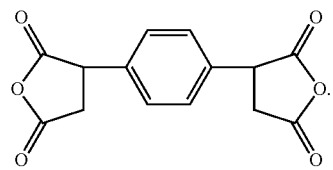
(II-6-1)

Examples of the fluorine-containing tetracarboxylic dianhydride compound can include but be not limited to 9,9-bis(trifluoromethyl)-9H-xanthene-2,3,6,7-tetracarboxylic dianhydride, tetracarboxylic acid compounds of Formulas (II-7) to (II-13) or any combination thereof:

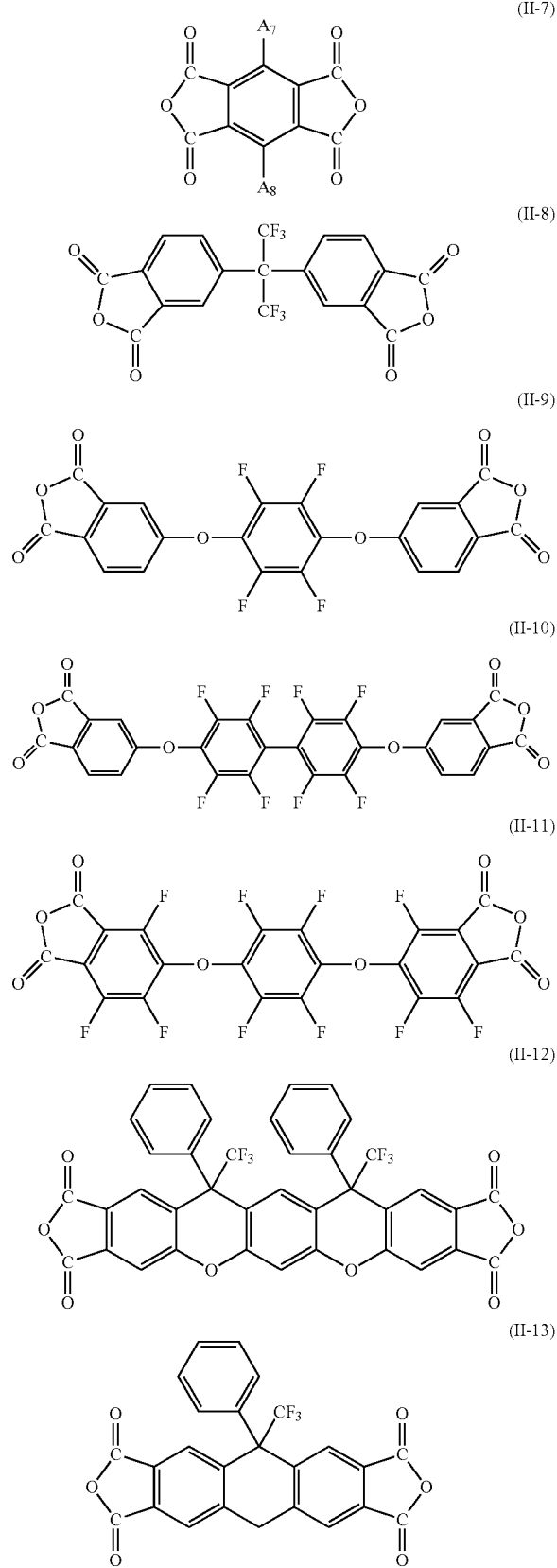

In the Formula (II-7), at least one of the $A_7$ and the $A_8$ is fluorine atom or trifluoromethyl group.

The aforementioned tetracarboxylic dianhydride component can be used alone or in combinations of two or more. The aforementioned tetracarboxylic dianhydride component can preferably include but be not limited to 1,2,3,4-cyclobutane tetracarboxylic dianhydride, 1,2,3,4-cyclopentane tetracarboxylic dianhydride, 2,3,5-tricarboxycyclopentyl acetic dianhydride, 1,2,4,5-cyclohexane tetracarboxylic dianhydride, 3,3',4,4'-dicyclohexyl tetracarboxylic dianhydride, bicyclo[2.2.1]heptane-2,3,5,6-tetracarboxylic dianhydride, 7-oxabicyclo[2.2.1]heptane-2,3,5,6-tetracarboxylic dianhydride, bicyclo[2.2.2]oct-7-ene-2,3,5,6-tetracarboxylic dianhydride, 8-thiabicyclo[3.2.2]nonane-2,3,6,7-tetracarboxylic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-diphenyltetracarboxylic dianhydride, 3,3',4,4'-diphenylsulfonetetracarboxylic dianhydride, 9,9-bis(trifluoromethyl)-9H-xanthene-2,3,6,7-tetracarboxylic dianhydride, 1,4-difluoro-2,3,5,6-pyromellitic dianhydride, 3,6-bis(trifluoromethyl)-1,2,4,5-pyromellitic dianhydride, the tetracarboxylic dianhydride compounds of Formula (II-8) or Formula (II-10) or the like.

Diamine Component

The diamine component can be selected from the group consisting of a aliphatic diamine compound, an alicyclic diamine compound, an aromatic diamine compound, a diamine compound of formulas (III-1) to (III-15), a fluorine-containing diamine compound or the like. The aforementioned diamine component can be used alone or in combinations of two or more.

The aliphatic diamine compound can include but be not limited to 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane 1,12-diaminooctadecane, 1,2-bis(3-aminopropoxy)ethane or the like.

The alicyclic diamine compound can include but be not limited to 4,4'-diamino-dicyclohexyl methane, 4,4'-diamino-3,3'-dimethyl-dicyclohexyl amine, 1,3-diaminocyclohexane, 1,4-diaminocyclohexane, isophoronediamine, tetrahydrodicyclopentadiene diamine, tricyclo[6.2.1.0$^{2,7}$]-undecene dimethyl-diamine, 4,4'-methylenebis(cyclohexylamine) or the like.

The aromatic diamine compound can include but be not limited to 4,4'-diamino diphenyl methane, 4,4'-diaminodiphenyl ethane, 4,4'-diaminodiphenyl sulfone, 4,4'-diaminobenzanilide, 4,4'-diaminodiphenyl ether, 3,4'-diaminodiphenyl ether, 1,5-diaminonaphthalene, 5-amino-1-(4'-aminophenyl)-1,3,3-trimethyl indane, 6-amino-1-(4'-aminophenyl)-1,3,3-trimethyl indane, hexahydro-4,7-methano indanylene dimethylene diamine, 3,3'-diamino benzophenone, 3,4'-diamino benzophenone, 4,4'-diamino benzophenone, 2,2-bis[4-(4-aminophenoxy)phenyl]propane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-amino-phenyl)-10-hydroanthracene, 9,10-bis(4-aminophenyl) anthracene, 2,7-diaminofluorene, 9-bis(4-aminophenyl) fluorene, 4,4'-methylene-bis(2-chloroaniline), 4,4'-(p-phenylene isopropylidene)dianiline, 4,4'-(m-phenylene isopropylidene)dianiline, 5-[4-(4-n-pentylcyclohexyl)cyclohexyl]

phenylmethylene-1,3-diaminobenzene, 1,1-bis[4-(4-aminophenoxy)phenyl]4-(4-ethylphenyl)cyclohexane or the like.

The diamine compounds of formulas (III-1) to (III-15) are shown as follows:

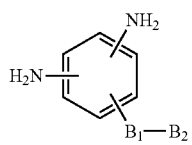
(III-1)

in Formula (III-1), the $B_1$ represents —O—, —COO—, —OCO—, —NHCO—, —CONH— or —CO—; the $B_2$ represents a steroid (cholesterol)-containing backbone, C2 to C30 alkyl group or a monovalent group that has a nitrogen-containing ring structure derived from pyridine, pyrimidine, triazine, piperidine and piperazine.

The diamine compound of Formula (III-1) is preferably selected from the group consisting of 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene or diamine compounds of following Formulas (III-1-1) to (III-1-4):

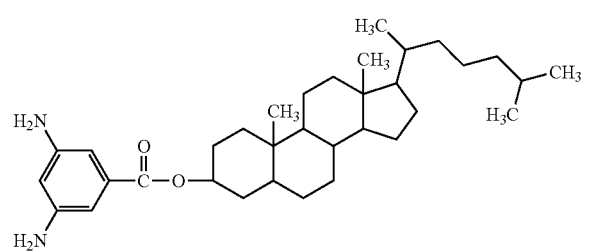
(III-1-1)

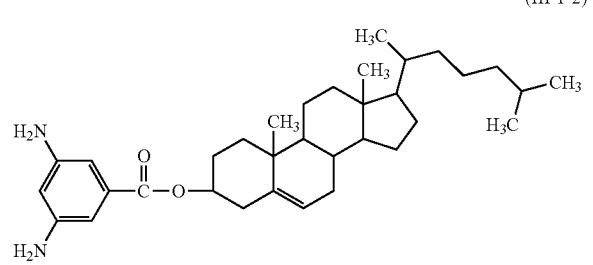
(III-1-2)

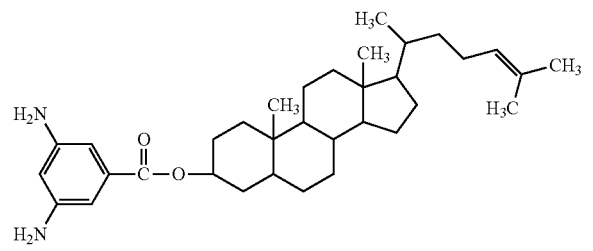
(III-1-3)

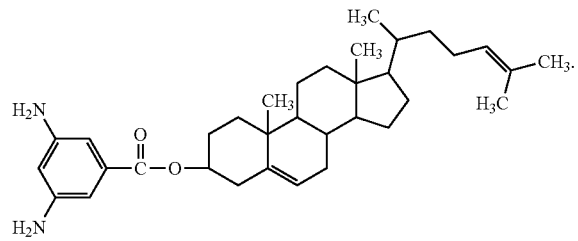
(III-1-4)

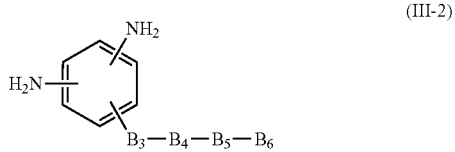
(III-2)

In Formula (III-2), the $B_3$ represents —O—, —COO—, —OCO—, —NHCO—, or —CO—; the $B_4$ and the $B_5$ represent a divalent group of an aliphatic ring, an aromatic ring or an heterocycle; and the $B_6$ represents a C3 to C18 alkyl group, a C3 to C18 alkoxy group, cyano group or chlorine atom. Preferably, the diamine compound of Formula (III-2) is selected from the group consisting of diamine compounds of Formulas (III-2-1) to (III-2-8) as follows:

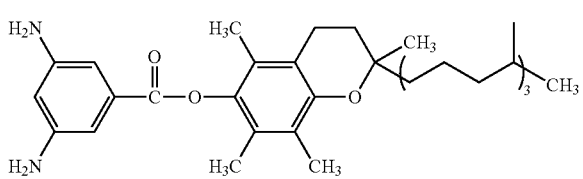
(III-2-1)

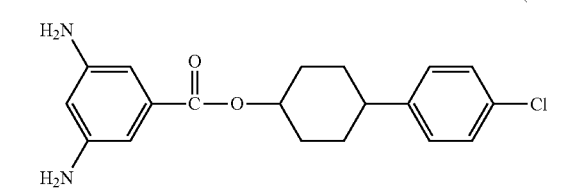

(III-2-2)

(III-2-3)

(III-2-4)

-continued

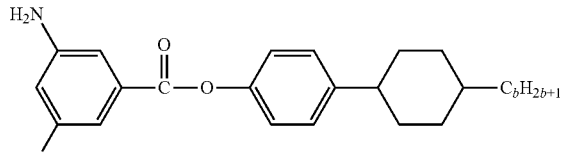
(III-2-5)

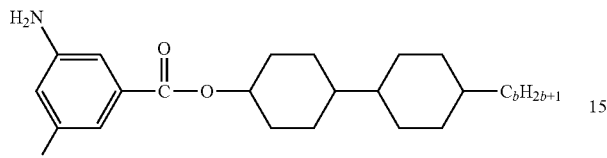
(III-2-6)

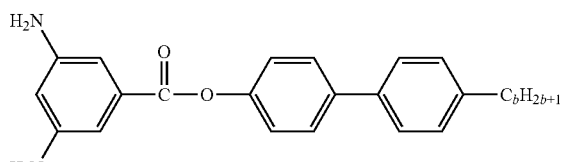
(III-2-7)

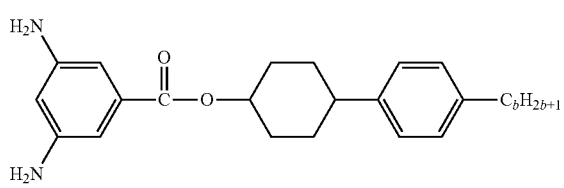
(III-2-8)

In Formulas (III-2-5) to (III-2-8 the b represents an integer of 3 to 12.

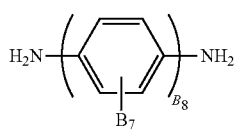
(III-3)

In Formula (III-3), the $B_7$ represents hydrogen, a C1 to C5 acyl group, a C1 to C5 alkyl group, a C1 to C5 alkoxy group or chlorine atom, and the $B_7$ of each repeating unit can be the same or different; and the $B_8$ is an integer of 1 to 3.

The diamine compound of the Formula (III-3) is preferably selected from the group consisting of the following ones: (1) when the $B_8$ is 1: p-diaminobenzene, m-diaminobenzene, o-diaminobenzene, 2,5-diaminotoluene or the like; (2) when the $B_8$ is 2: 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl or 2,2'-dichloro-4,4'-diamino-5,5'-dimethoxybiphenyl or the like; (3) when the $B_8$ is 3: 1,4-bis(4'-aminophenyl)benzene. More preferably, the diamine compound of the Formula (III-3) is selected from the group consisting of p-diaminobenzene, 2,5-diaminotoluene, 4,4'-diaminobiphenyl, 3,3'-dimethoxy-4,4'-diaminobiphenyl or 1,4-bis(4'-aminophenyl)benzene.

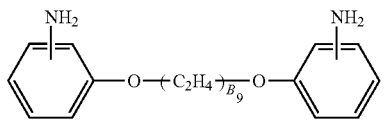
(III-4)

Formula (III-4) the $B_9$ is an integer of 2 to 12.

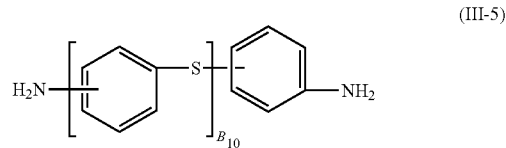
(III-5)

In Formula (III-5), the $B_{10}$ represents an integer of 1 to 5. The compound of Formula (III-5) is preferably 4,4'-diaminodiphenylsulfide.

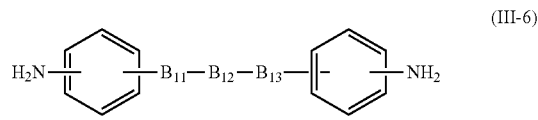
(III-6)

In Formula (III-6), the $B_{11}$ and the $B_{12}$ are the same or different divalent organic group(s), the $B_{13}$ represents a divalent group that has a nitrogen-containing ring structure derived from pyridine, pyrimidine, triazine, piperidine and piperazine.

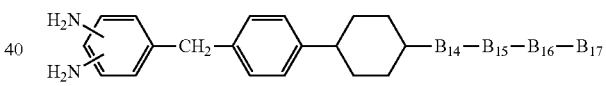
(III-7)

In Formula (III-7), the $B_{14}$ represents —O— or cyclohexalene, the $B_{15}$ represents $CH_2$—, the $B_{16}$ represents phenylene or cyclohexalene, and the $B_{17}$ represents hydrogen or heptyl group.

The diamine compound of Formula (III-7) is preferably selected from the group consisting of diamine compounds of Formulas (III-7-1) to (III-7-2) as follows:

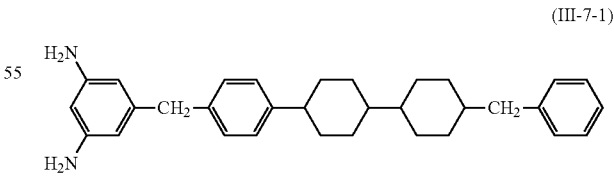
(III-7-1)

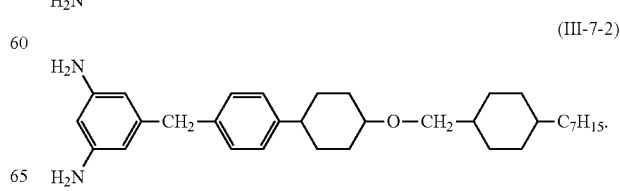
(III-7-2)

The other diamine compound (b-3) of Formulas (III-8) to (III-15) is shown as follows:

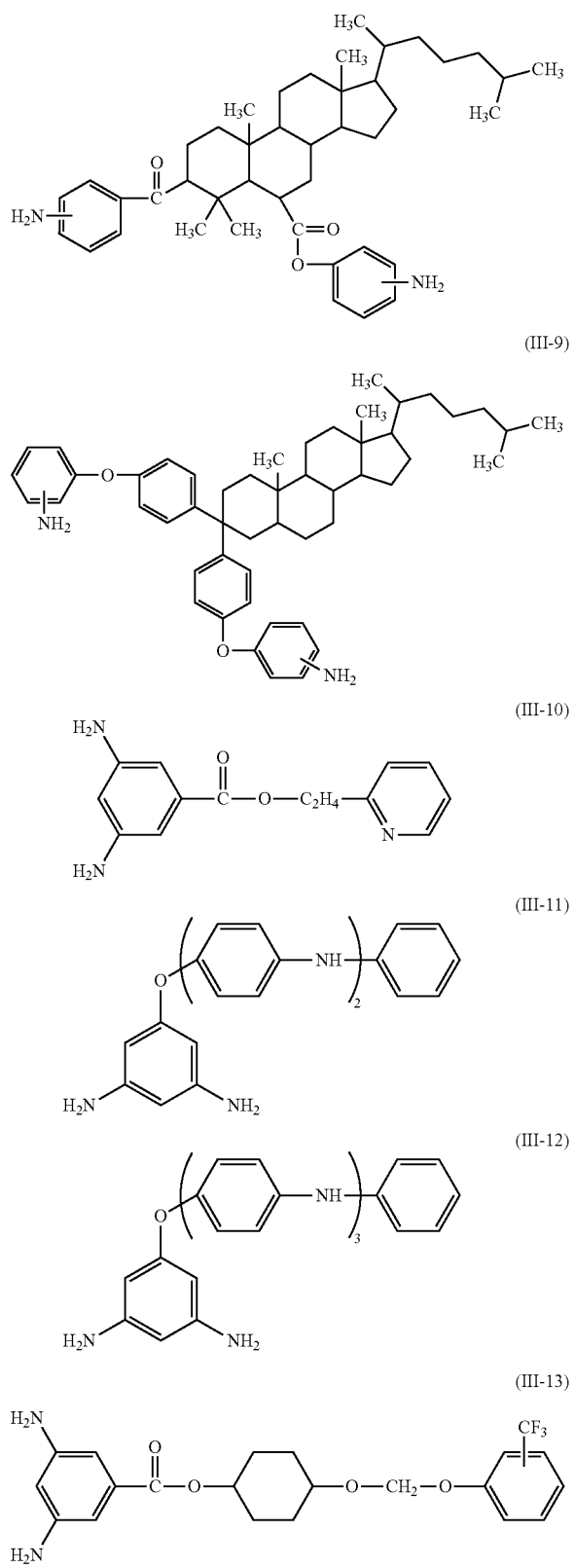

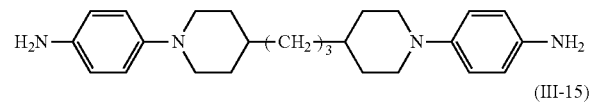

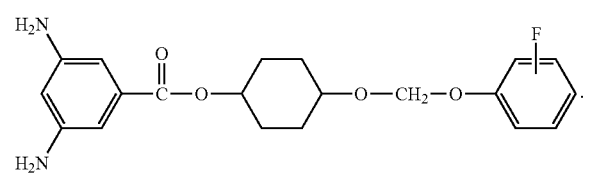

The fluorine-containing diamine compound can be preferably selected from the group consisting of 2,2-bis[4-(4-aminophenoxy)phenyl]-1,1,1,3,3,3-hexafluoropropane, 22-bis[4-(3-aminophenoxy)phenyl]-1,1,3,3,3-hexafluoropropane, 2,2-bis[3-(4-aminophenoxy)phenyl]-1,1,1,3,3,3-hexafluoropropane, 2,2-bis[3-(3-aminophenoxy)phenyl]-1,1,1,3,3,3-hexafluoropropane, 2,2-bis(4-aminophenyl)-1,1,1,3,3,3-hexafluoropropane, 2,2-bis(3-amino-4-hydroxyphenyl)-1,1,1,3,3,3-hexafluoropropane, bis(2,3,5,6-tetrafluoro-4-aminophenyl)ether, bis(2,3,5,6-tetrafluoro-4-aminophenyl)sulfide, 2,2'-bis(trifluoromethyl)-4,4'-benzidine, 3,3'-bis(trifluoromethyl)-4,4'-benzidine, a diamine compound of Formulas (III-16) to (III-45) or any combination thereof:

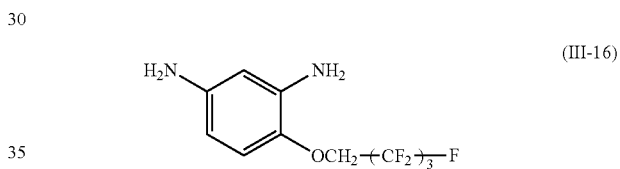

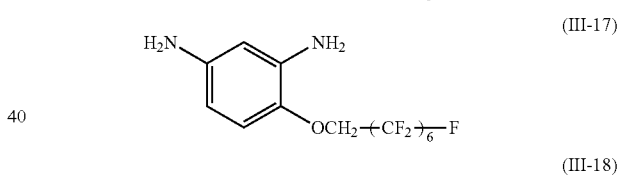

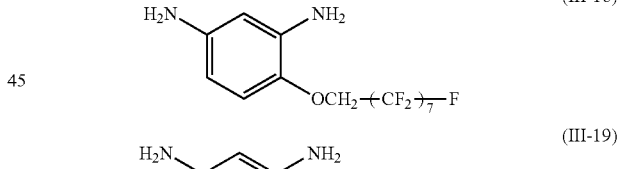

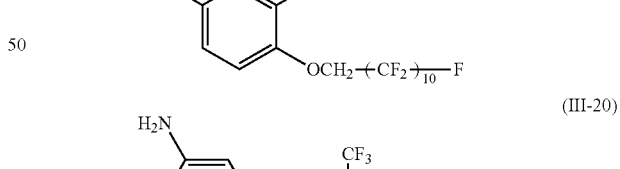

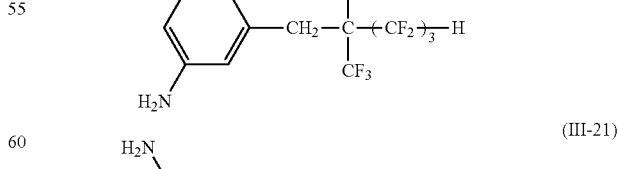

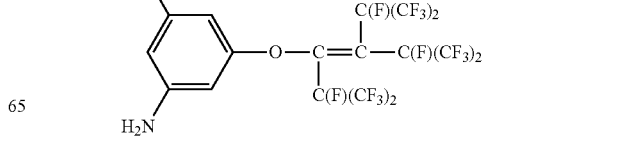

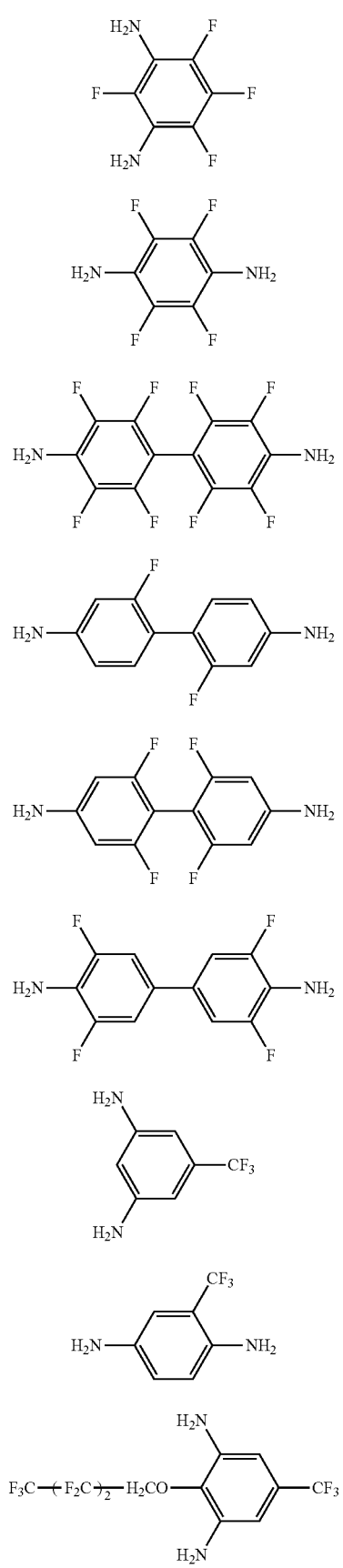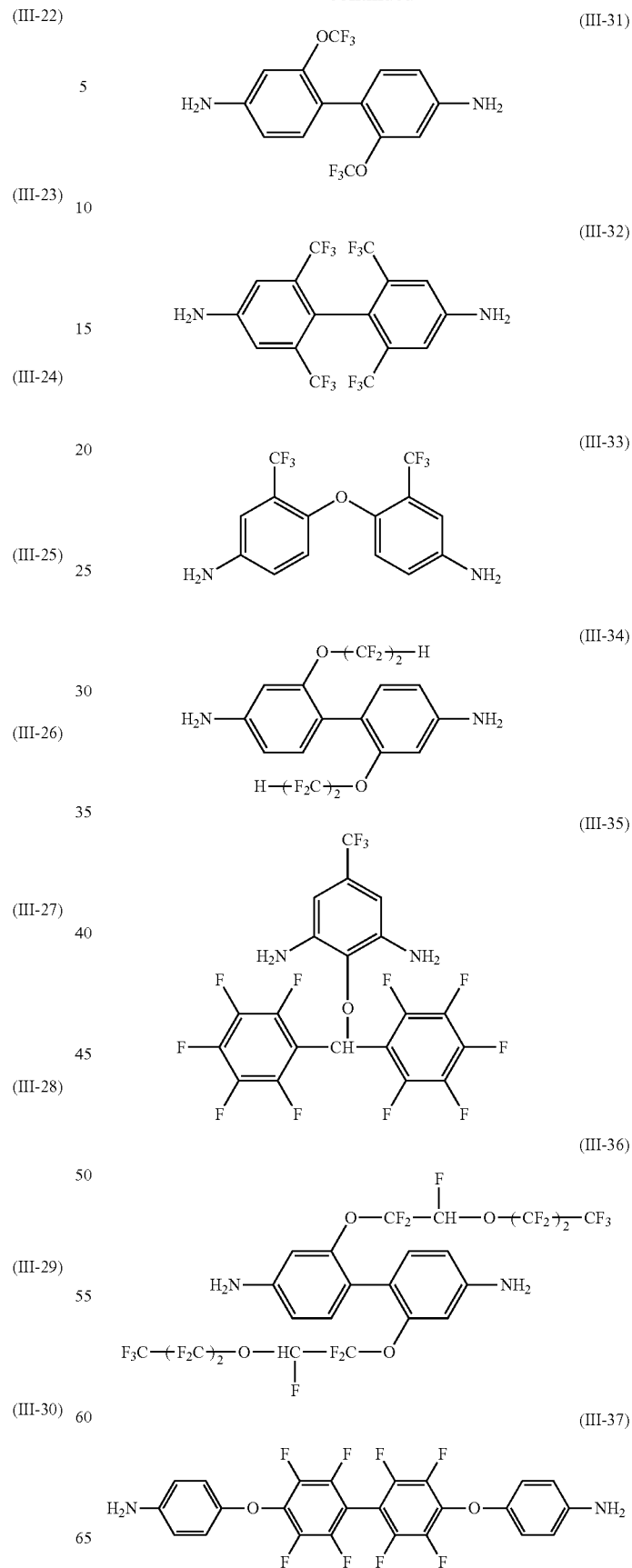

-continued

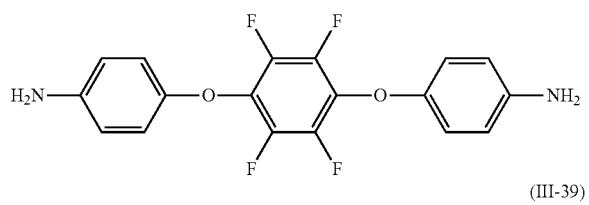 (III-38)

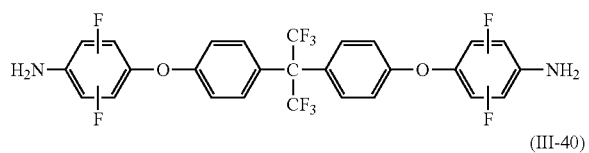 (III-39)

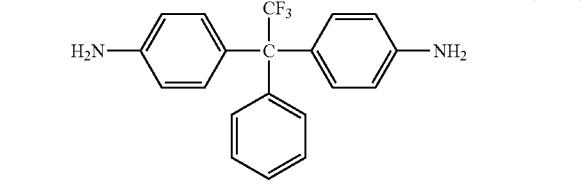 (III-40)

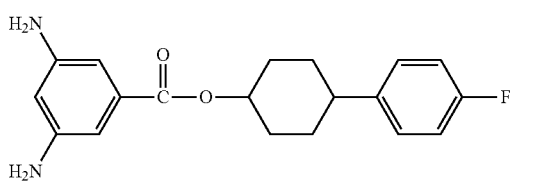 (III-41)

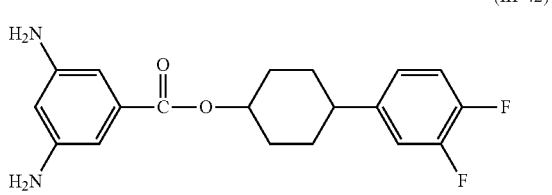 (III-42)

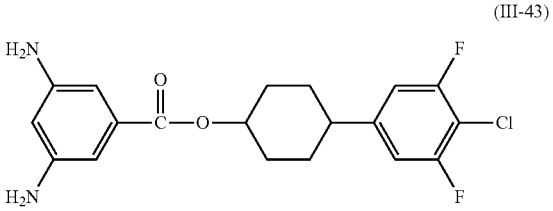 (III-43)

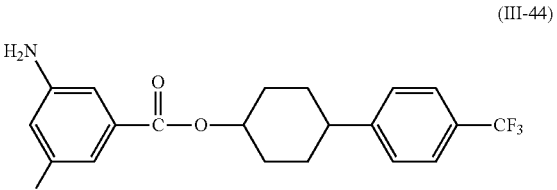 (III-44)

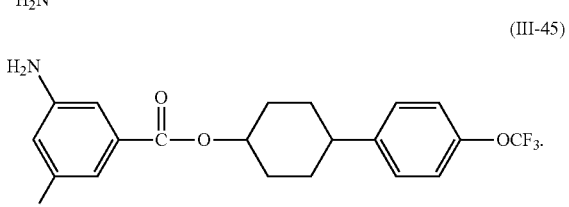 (III-45)

The aforementioned diamine component can be used alone or in combinations of two or more. The diamine component can preferably include but be not limited to 1,2-diaminoethane, 4,4'-diaminodicyclohexylmethane, 1,4-diaminocyclohexane, 4,4'-diaminodiphenyl methane, 4,4'-diaminodiphenyl ether, 5-[4-(4-n-pentylcyclohexyl)cyclohexyl] phenylmethylene-1,3-diamino benzene, 1,1-bis[4-(4-aminophenoxy)phenyl]-4-(4-ethylphenyl)cyclohexane, 2,4-diaminophenyl ethyl formate, p-diaminobenzene, m-diaminobenzene, o-diaminobenzene, 4,4'-diaminobiphenyl, 2,2-bis[4-(4-aminophenoxy)phenyl]-1,1,1,3,3,3-hexafluoropropane, 2,2-bis(3-aminophenyl)-1,1,1,3,3,3-hexafluoropropane, bis(2,3,5,6-tetrafluoro-4-aminophenyl) ether, 2,2'-bis(trifluoromethyl)-4,4'-benzidine, or the diamine compound of the Formulas (III-1-1), (III-1-2), (III-2-1), (III-2-6), (III-7-1), (III-23), (III-25), (III-26), (III-27), (III-33), (III-37) or (III-39).

Preparation of Polymer (A)

Preparation of Polyamic Acid Resin

The polyamic acid resin can be obtained by using the steps as follows. A mixture including the tetracarboxylic dianhydride component and the diamine component is dissolved in a solvent and then subjected to polymerization at a temperature of 0° C. to 100° C. for 1 hour to 24 hours. Next, the reaction solution is distillated under a reduced pressure in a distiller, so as to obtain the polyamic acid resin. Alternatively, the reaction solution can be added with a large amount of a poor solvent to obtain a precipitate, and then the precipitate is dried under a reduced pressure, so as to obtain the polyamic acid resin.

Based on the total molar number of the diamine component as 100 moles, a usage amount of the tetracarboxylic dianhydride component is preferably 20 moles to 200 moles, and more preferably 30 moles to 120 moles.

The aforementioned solvent of the polymerization can be the same as or different from the solvent used in the composition for the flexible substrate, and the solvent of the polymerization is used to dissolve the reactant and the product without any specific limitation. Preferably, the solvent can include but be not limited to (1) aprotic polar solvents: N-methyl-2-pyrrolidone, N,N-dimethylacetamide, N,N-dimethylformamide, dimethylsulfoxide, γ-butyrolactone, tetramethylurea, hexamethylphosphoric acid triamide or the like; and (2) phenolic solvents: m-cresol, xylenol, phenol, halogenated phenols or the like. Preferably, based on the total usage amount of the mixture as 100 parts by weight, a usage amount of the solvent of the polymerization is 200 parts by weight to 2,000 parts by weight, and more preferably 300 parts by weight to 1,800 parts by weight.

In particularly, in the polymerization, the solvent can be used in combination with a poor solvent in an appropriate amount such that the polyamic acid resin will not be precipitated out. The poor solvent can be used alone or in combination with two or more. The poor solvent can include but be not limited to: (1) alcohols: methanol, ethanol, isopropanol, cyclohexanol, ethylene glycol, propylene glycol, 1,4-butanediol, triethylene glycol or the like; (2) ketones: acetone, methyl ethyl ketone, methyl isobutyl ketone, cyclohexanone or the like; (3) esters; methyl acetate, ethyl acetate, butyl acetate, diethyl oxalate, diethylmalonate, ethylene glycol ethyl ether acetate or the like; (4) ethers: diethyl ether, ethylene glycol methyl ether, ethylene glycol ethyl ether, ethylene glycol n-propyl ether, ethylene glycol i-propyl ether, ethylene glycol n-butyl ether, ethylene glycol dimethyl ether, diethylene glycol dimethyl ether or the like; (5) halogenated hydrocarbons: dichloromethane, 1,2-dichloroethane, 1,4-dichlorobutane, trichloroethane, chlorobenzene, o-dichlorobenzene or the like; (6) hydrocarbons: tetrahydrofuran, hexane, heptane, octane, benzene, toluene, xylene or the like; or (7) any combination thereof. Preferably, based on the total usage amount of the diamine component as 100 parts by weight, a usage amount of the poor solvent is 0 part by weight to 60 parts by weight, and more preferably 0 part by weight to 50 parts by weight.

Preparation of Polyimide Resin

The polyimide resin can be obtained by using the steps as follows. A mixture including the tetracarboxylic dianhydride component and the diamine component is dissolved in a solvent and then subjected to polymerization, thereby forming the polyimide resin. And then, in the presence of a dehydrating agent and an imidization catalyst, the reaction solution is heated and subjected to a dehydration/ring-closing reaction, thereby converting the auric acid group of the polymerization into the imido group (i.e. imidization).

The aforementioned polymerization and the dehydration/ring-closing reaction can be operated under the reaction temperature and time commonly known by this technical field. Preferably, the polymerization is generally carried out under a temperature of 0° C. to 100° C. for 1 hour to 24 hours. Preferably, the dehydration/ring-closing reaction is generally carried out under a temperature of 30° C. to 200° C. for 0.5 hour to 50 hours.

The aforementioned solvent of the dehydration/ring-closing reaction can be the same as or different from the solvent used in the composition for the flexible substrate rather than being recited repetitively. Preferably, based on the a usage amount of the polyamic add resin as 100 parts by weight, a usage amount of the solvent of the dehydration/ring-closing reaction is 200 part by weight to 2,000 parts by weight, and more preferably 300 part by weight to 1,800 parts by weight.

The dehydrating agent used in the dehydration/ring-closing reaction includes: (1) acid anhydride compounds: acetic anhydride, propionic anhydride or trifluoroacetic anhydride, and a usage amount of such dehydrating agent is generally 0.01 mole to 20 moles based on the usage amount of the polyamic acid resin as 1 mole. Moreover, the catalyst used in the dehydration/ring-closing reaction includes: (1) pyridine compounds: pyridine, trimethylpyridine, dimethylpyridine or the like; and (2) tertiary amines: triethylamine or the like. A usage amount of the catalyst is generally 0.5 moles to 10 moles based on the usage amount of the dehydrating agent as 1 mole.

The imidization ratio of the polymer (A) of the present invention is generally 50% to 100%, preferably 60% to 100%, and more preferably 70% to 100%. When the imidization ratio of the polymer (A) is in the aforementioned range, the composition for a flexible substrate can have better thermal yellowing resistance.

Inorganic Oxide Particle (B)

The inorganic oxide particle (B) of the present invention can be a silicon compound particle, an aluminum compound particle, a tin compound particle, a titanium compound particle, a zirconium compound particle, a barium compound particle or a composite particle thereof, Examples of the silicon compound particle includes: commercially available products such as the trade names of OSCAR 101 (the averaged diameter is 12 nm), OSCAR 105 (the averaged diameter 60 nm), OSCAR 106 (the averaged diameter is 120 nm) or CATALOID-S (the averaged diameter is 5 nm to 80 nm) manufactured by JGC CORPORATION; commercially available products such as the trade names of IPA-ST (the averaged diameter is 12 nm), IPA-ST-L (the averaged diameter is 45 nm), IPA-ST-ZL (the averaged diameter is 100 nm), MEK-ST, MIBK-ST (the averaged diameter is 12 nm), NBA-ST, PGM-ST (the averaged diameter is 15 nm), XBA-ST, DMAC-ST, ST-UP, ST-OUP, ST-20, ST-40, ST-C, ST-N, ST-N, ST-O, ST-50, ST-OL or OZ-S30K manufactured by Nissan Chemical Industries, Ltd.; the trade name of SG-SO100 (the averaged diameter is 100 nm, manufactured by KCM Co., Ltd.); the commercially available products such as the trade name of KUOTORON PL-2L-PGME (the averaged diameter is 16 nm) KUOTORON PL-2L-BL (the averaged diameter is 17 nm), KUOTORON PL-2L-DAA (the averaged diameter is 17 nm), KUOTORON PL-2L (the averaged diameter is 18 nm to 20 nm) or GP-2L (the averaged diameter is 18 nm to 20 nm) manufactured by Fuso Chemical Co., Ltd.; the trade name of Reolosil (the averaged diameter is 5 nm to 50 nm, manufactured by TOKUYAMA Co., Ltd.). Examples of the aluminum compound particle includes: commercially available products such as the trade name of Aluminium oxide nanopowder manufactured by SIGMA-ALDRICH Co., Ltd. (product number: 718475, and the averaged diameter is 13 nm). Examples of the tin compound particle includes commercially available products manufactured by Kojundo Chemical Laboratory Co., Ltd. Examples of the titanium compound particle includes commercially available products such as the trade names of OPTOLAKE TR-505 (manufactured by JGC CORPORATION); and the trade names of MT-05, MT-100W, MT-100SA, MT-100HD, MT-300HD, MT-150A, ND138, ND139, ND140, ND154, ND165, ND177, TS-063, TS-103 or TS-159 (manufactured by TAYCA Co., Ltd.). Examples of the zirconium compound particle includes: commercially available products such as the trade names of OPTOLAKE TR-554 (manufactured by JGC CORPORATION); and the trade names of HXU-110JC, HXU-210C or NZD-3101 (manufactured by Sumitomo Osaka Cement Co., Ltd.). Examples of the composite particle includes: silicon dioxide-titanium dioxide composite particles, such as the trade names of OPTOLAKE TR-502, OPTOLAKE TR-503, OPTOLAKE TR-504, OPTOLAKE TR-513, OPTOLAKE TR-520, OPTOLAKE TR-527, OPTOLAKE TR-528 or OPTOLAKE TR-529 (manufactured by JGC CORPORATION); silicon dioxide-aluminum dioxide composite particles, such as the trade names of Admafine SO-E1, SO-E2, SO-E3, SO-E4, SO-E5 or SE3200-SEJ (manufactured by Admatechs Co., Ltd.); and tin dioxide-zirconium dioxide composite particles (manufactured by JGC CORPORATION)

The organic oxide particle (B) can be used alone or in combination with two or more.

Based on the usage amount of the polymer (A) as 100 parts by weight, a usage amount of the inorganic oxide particle (B) is generally 10 parts by weight to 100 parts by weight, preferably 15 parts by weight to 80 parts by weight, and more preferably 20 parts by weight to 60 parts by weight.

If there was no inorganic oxide particle (B) included in the composition for a flexible substrate of the present invention, the composition for a flexible substrate would raise thermal yellowing disadvantage.

The averaged diameter of the inorganic oxide particle (B) is generally 3 nm to 30 nm, preferably 4 nm to 25 nm, and more preferably 5 nm to 20 nm. When the averaged diameter of the inorganic oxide particle (B) is in the aforementioned range, the resulted flexible substrate can have high transparency.

Silane Compound Containing Amino Group (C)

Examples of the silane compound containing an amino group (C) of the present invention includes: 3-aminopropyl trimethoxysilane, 3-aminopropyl triethoxysilane, 3-aminopropylmethyl dimethoxysilane, 4-aminobutyl trimethoxysilane, 4-aminobutyl triethoxysilane, 4-aminobutylmethyl dimethoxysilane, 5-aminopentyl trimethoxysilane, 5-aminopentyl triethoxysilane, 5-aminopentylmethyl dimethoxysilane, N-2-(aminoethyl)-3-aminopropyl trimethoxysilane, N-2-(aminoethyl)-3-aminopropyl triethoxysilane, N-2-(aminoethyl)-3-aminopropylmethyl dimethoxysilane, N-phenyl-3-aminopropyl trimethoxysilane, N-phenyl-3-aminopropyl triethoxysilane, N-phenyl-3-aminopropylmethyl dimethoxysilane. Among those, the silane compound containing an amino group (C) is preferably 3-aminopropyl trimethoxysilane, 3-aminopropyl triethoxysilane, N-2-(aminoethyl)-3-aminopropyl trimethoxysilane, N-2-(aminoethyl)-3-aminopropyl triethoxysilane, N-phenyl-3-aminopropyl trimethoxysilane and N-phenyl-3-aminopropylmethyl dimethoxysilane.

Based on a usage amount of the polymer (A) as 100 parts by weight, a usage amount of the silane compound containing an amino group (C) is 0.5 parts by weight to 15 parts by weight, preferably 1 parts by weight to 12 parts by weight, and more preferably 2 parts by weight to 10 parts by weight.

If there was no the silane compound containing an amino group C) included in the composition for the flexible substrate of the present invention, the composition for the flexible substrate would raise thermal yellowing.

Solvent (D)

The solvent (D) used in the composition for the flexible substrate is preferably selected from the group consisting of the following ones: N-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide or any combination thereof.

Based on the usage amount of the polymer (A) as 100 parts by weight, a usage amount of the solvent (D) is 200 parts by weight to 2000 parts by weight, preferably 250 parts by weight to 1800 parts by weight, and more preferably 300 parts by weight to 1500 parts by weight.

Compound of Formula (I) (E)

The composition for the flexible substrate of the present invention can optionally include a compound of Formula (I) (E) as below:

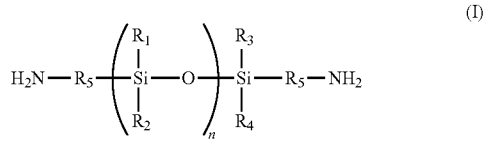

(I)

In the Formula (I), the $R_1$, the $R_2$, the $R_3$ and the $R_4$ can be the same or different monovalent hydrocarbon group(s); a plurality of the $R_5$ are the same or different divalent hydrocarbon group(s) and the n represents an integer of 1 to 10.

Examples of the compound of Formula (E) can include: 1,3-bis(3-aminopropyl)-1,1,3,3-tetramethyl disiloxane, 1,3-bis(3-aminobutyl)-1,1,3,3-tetramethyl disiloxane, 1,3-bis(3-aminopropyl)-1,1,3,3-tetraphenyl disiloxane, 1,3-bis(4-amino-3-methylphenyl)-1,1,3,3-tetramethyl disiloxane, 1,3-bis(3-aminopropyl)-1,3-diphenyl-1,3-dimethyl disiloxane or 1,5-bis(3-aminopropyl)-1,3,3,5-tetraphenyl-1,5-dimethyl trisiloxane. Among those, the compound of Formula (I) (E) is preferably 1,3-bis(3-aminopropyl)-1,1,3,3-tetramethyl disiloxane, 1,3-bis(3-aminopropyl)-1,1,3,3-tetraphenyl disiloxane and 1,5-bis(3-aminopropyl)-1,3,3,5-tetraphenyl-1,5-diethyl trisiloxane.

The compound of the Formula (I) (E) of the present invention can be used alone or in combination with two or more. Based on the usage amount of the polymer (A) as 100 parts by weight, a usage amount of the compound (E) is generally 0.1 parts by weight to 3 parts by weight, preferably 0.3 parts by weight to 2.8 parts by weight, and more preferably 0.5 parts by weight to 2.5 parts by weight.

When the composition for the flexible substrate includes the compound of the Formula (I) (E), the composition for the flexible substrate can have better thermal yellowing resistance.

In addition, the aforementioned diamine component, which can optionally include the compound of the Formula (I) (E), reacts with the tetracarboxylic dianhydride component to synthesize the polymer (A). When the diamine component includes the compound of the Formula (I) (E), the resulted flexible substrate has the advantage of good adhesion property.

Preparation of Composition for Flexible Substrate

In general, the composition for the flexible substrate of the present invention has no specific limitation, which can be prepared by mixing the aforementioned polymer (A), the inorganic oxide particle (B), the silane compound containing an amino group (C) and the solvent (D) in a conventional mixer uniformly until all components are mixed uniformly, optionally adding the compound of the Formula (I) (E) thereto if necessary, so as to obtain the composition for the flexible substrate.

Preparation of Flexible Substrate

The flexible substrate of the present invention is made by the aforementioned composition for the flexible substrate.

The composition for the flexible substrate can be coated onto a base plate, and then dried, cured and separated from the base plate.

During the coating step, conventional coating methods such as spin coating, cast coating or roll coating can be available in the present invention instead of being recited in detail. With regard to the drying step, conventional drying methods can be used in the present invention for removing solvents. The drying step is preferably performed at 50° C. to 200° C. for 1 minute to 2 hours. As to the curing step, conventional curing methods can be used in the present invention, so as to remove residual solvents completely and to form a flexible substrate with a more compact structure. The curing step is preferably carried out at 150° C. to 500° C. for 10 minutes to 2 hours.

With respect to the separating step, conventional separating methods, for example, stripping, dry etching or wet etching can be used to separate the flexible substrate from the base plate.

The aforementioned base plate can include but be not limited to alkali-free glass, soda-lime glass, hard glass (Pyrex glass) quartz glass or silicon wafer.

The resulted flexible substrate can be applied in flexible liquid crystal displays or electronic books.

It is to be understood that both the foregoing general description and the following detailed description are by examples, and are intended to provide further explanation of the invention as claimed.

DETAILED DESCRIPTION

Preparation of Polymer (A)

The polymer (A) was prepared by Synthesis Examples A-1-1 to A-2-10 according to TABLE 1.

Synthesis Example A-1-1

A 500 mL four-necked flask equipped with a nitrogen inlet, a stirrer, a condenser and a thermometer was purged with nitrogen, and the following components were charged to the flask. The aforementioned components comprising 5.4 g (0.05 moles) of p-diaminobenzene (b-1) and 70 g (0.05 moles) of N-methyl-2-pyrrolidone (hereinafter abbreviated to NMP) were stirred to dissolve completely under room temperature (e.g. 25° C.). Next, 10.919 (0.05 moles) of pyromellitic dianhydride (a-1) and 30 g of NMP were added into the reaction solution and reacted under room temperature (e.g. 25° C.) for 2 hours. After the reaction was terminated, the reaction solution was poured into 1500 mL of water for precipitating the polymer. After filtering the obtained polymer, the collected polymer was repetitively rinsed by methanol and filtered in three times. And then, the product was dried in a vacuum oven at 60° C., thereby obtaining a polymer (A-1-1). The imidization ratio of the polymer (A-1-1) was determined by using the following evaluation methods and resulted in TABLE 1. The detection method of the imidization ratio was described as follows.

Synthesis Examples A-1-2 to A-1-5

Synthesis Examples A-1-2 to A-1-5 were practiced with the same method as in Synthesis Example A-1-1 by using different kinds and different amounts of the components of the polymer (A-1-1). The formulations of Synthesis Examples A-1-2 to A-1-5 were also listed in TABLE 1 rather than focusing or mentioning them in detail.

Synthesis Example A-2-1

A 500 mL four-necked flask equipped with a nitrogen inlet, a stirrer, a heater, a condenser and a thermometer was purged with nitrogen, and the following components were charged to the flask. The aforementioned components comprising 5.4 g (0.05 moles) of p-diaminobenzene (b-1) and 70 g (0.05 moles) of NMP were stirred to dissolve completely under room temperature (e.g. 25° C.). Next, 10.91 g (0.05 moles) of pyromellitic dianhydride (a-1) and 30 g of NMP were added into the reaction solution and reacted under room temperature (e.g. 25° C.) for 6 hours. And then, 97 g of NMP, 5.61 g of acetic anhydride and 19.35 g of pyridine were added into the reaction solution, heated to 55° C. and kept stirring for 2 hours for proceeding a dehydration/ring-closing reaction. After the reaction was terminated, the reaction solution was poured into 1500 mL of water for precipitating the polymer. After filtering the obtained polymer, the collected polymer was repetitively rinsed by methanol and filtered in three times. And then, the product was dried in a vacuum oven at 60° C., thereby obtaining a polymer (A-2-1). The imidization ratio of the polymer (A-2-1) was determined by using the following evaluation methods and resulted in TABLE 1.

Synthesis Examples A-2-2 to A-2-10

Synthesis Examples A-2-2 to A-2-10 were practiced with the same method as in Syntheses Example A-2-1 by using different kinds and different amounts of the components of the polymer (A-2-1). The formulations of Synthesis Examples A-2-2 to A-2-10 were also listed in TABLE 1 rather than focusing or mentioning them in detail.

Preparation of Composition for Flexible Substrate

The following examples were directed to the preparation of the composition for the flexible substrate of Examples 1 to 14 and Comparative Examples 1 to 8 according to TABLES 2 and 3.

Example 1

100 parts by weight of the polymer (A-1-1) of Synthesis Example (A-1-1), 15 parts by weight of the silicon dioxide particle (IPA-ST, the averaged diameter is 12 nm, manufactured by Nissan Chemical Industries), 1 part by weight of the N-2-(aminoethyl)-3-aminopropyl trimethoxysilane and 400 part by weight of NMP were stirred and mixed under room temperature (e.g. 25° C.), so as to obtained the composition for the flexible substrate of Example 1. The resulted composition for the flexible substrate was determined by using the following evaluation methods and resulted in TABLE 3. The detection methods of the transparency and thermal yellowing resistance were described as follows.

Examples 2 to 14 and Comparative Examples 1 to 8

Examples 2 to 14 and Comparative Examples 1 to 8 were practiced with the same method as in Example 1 by using different kinds and different amounts of the components of the composition for the flexible substrate. The formulations and evaluation results of Examples 2 to 14 and Comparative Examples 1 to 8 were listed in TABLES 2 to 3 rather than focusing or mentioning them in detail.

Evaluation Methods

1. Imidization Ratio

The imidization ratio was referred to a ratio of the imide ring, which was calculated according to the total amount of the number of the amic acid group and the number of the imide ring in the polyimide polymer, and the ratio of the imide ring was represented as percentage.

Each of the polymers (A-1-1) to (A-2-10) of Synthesis Examples A-1-1 to A-2-10 was dried under a reduced pressure and then dissolved in an appropriate deuterated solvent (e.g. deuterated dimethylsulfoxide). $^1$H-NMR (proton nuclear magnetic resonance) results of the polymers (A-1-1) to (A-2-10) were measured under room temperature (e.g. 25° C.) by using tetramethylsilane as a reference standard, and the imidization ratio (%) of the polymers (A-1-1) to (A-2-10) were calculated according to Equation (IV) as below:

$$\text{Imidization Ratio}(\%) = \left[1 - \frac{\Delta 1}{\Delta 2 \times \alpha}\right] \times 100\% \quad (IV)$$

In the Equation (IV), the $\Delta 1$ was referred to a peak area produced by chemical shift around 10 ppm of the proton of the NH group, the $\Delta 2$ was referred to a peak area of other protons, and the $\alpha$ was referred to a number ratio of the proton number of NH group to the number of other protons in the polyamic acid precursor of those polymers.

2. Transparency

Each of the composition for the flexible substrate of Examples 1 to 14 and Comparative Examples 1 to 8 was coated onto a 100 mm*100 mm glass base plate by using the spin-coating method, and then prebaked at 80° C. for 20 minutes to form a prebaked coating film with thickness of 30 μm. Next, those prebaked coating film were postbaked at 300° C. for 60 minutes, so as to obtain a laminate including a flexible substrate disposed on the glass base plate. Transmittance (%) of each flexible substrate of the laminate was measured by using a spectrophotometer (Model No. U-3310, manufactured by Hitachi) at a wavelength of 400 nm and evaluated according to the following criterion:

◎: 90%<transmittance;
○: 85%<transmittance≤90%;
Δ: 80%<transmittance≤85%;
x: transmittance≤0%.

3. Thermal Yellowing Resistance

Each of the compositions of the flexible substrate of Examples 1 to 14 and Comparative Examples 1 to 8 was coated onto a 100 mm*100 mm glass base plate by using the spin-coating method, and then prebaked at 80° C. for 20 minutes to form a prebaked coating film with thickness of 30 μm. Next, those prebaked coating film were postbaked at 300° C., so as to obtain a laminate including a flexible substrate disposed on the glass base plate. Thermal yellowing resistance of each flexible substrate of the laminate was measured after being postbaked for 30 minutes or 60 minutes by visual inspection, and evaluated according to the following criterion:

◎: no yellowing, appeared after being postbaked for 30 minutes or 60 minutes;
○: no yellowing appeared after being postbaked for 30 minutes, but little yellowing appeared after being postbaked for 60 minutes;
x: significant yellowing appeared after being postbaked for 30 minutes or 60 minutes.

As shown in the results in TABLES 1 to 3, when the composition for the flexible substrate included the inorganic oxide particle (B) and the silane compound containing an amino group (C), the composition for the flexible substrate had better thermal yellowing resistance. Moreover, the compound (E) was further used in the composition of the flexible substrate, the composition for the flexible substrate had much better thermal yellowing resistance.

In addition, when the imidization ratio (%) of the polymer (A) was 50% to 100%; the composition for a flexible substrate had much better thermal yellowing resistance.

It should be supplemented that, although specific compounds, components, reaction conditions, processes, evaluation methods or specific equipments are described as examples of the present invention, for illustrating the composition for the flexible substrate and flexible substrate of the present invention. However, as is understood by a person skilled in the art instead of limiting to the aforementioned examples, the composition for the flexible substrate and flexible substrate of the present invention also can be manufactured by using other compounds, components, reaction conditions, processes, evaluation methods and equipments without departing from the spirit and scope of the present invention.

Although the present invention has been described in considerable detail with reference to certain embodiments thereof, other embodiments are possible. Therefore, the spirit and scope of the appended claims should not be limited to the description of the embodiments contained herein.

TABLE 1

| Components (mole %) | | A-1-1 | A-1-2 | A-1-3 | A-1-4 | A-1-5 | A-2-1 | A-2-2 | A-2-3 | A-2-4 | A-2-5 | A-2-6 | A-2-7 | A-2-8 | A-2-9 | A-2-10 |
|---|---|---|---|---|---|---|---|---|---|---|---|---|---|---|---|---|
| Tetra-carboxylic dianhydride component (a) | a-1 | 100 | | | | | 100 | | | | | 50 | | | | |
| | a-2 | | 100 | | | | | 100 | | | | 50 | 50 | | 60 | |
| | a-3 | | | 100 | | | | | 100 | | | | | 70 | | 100 |
| | a-4 | | | | 100 | 50 | | | | 100 | | | 50 | 30 | | |
| | a-5 | | | | | 50 | | | | | 100 | | | | 40 | |
| Diamine component (b) | b-1 | 100 | | | | | 100 | | | | | | | | 20 | |
| | b-2 | | 100 | | | | | 100 | | | | 70 | | 95 | | |
| | b-3 | | | 70 | | | | | 70 | | 60 | | | | | |
| | b-4 | | | 30 | 100 | | | | 30 | 100 | | | 50 | | | |
| | b-5 | | | | | 50 | | | | | 40 | | 50 | | 80 | 70 |
| | b-6 | | | | | 50 | | | | | | 30 | | | | 30 |
| | b-7 | | | | | | | | | | | | | 5 | | |
| Dehydration/ring-closing reaction | Dehydrating agent (g) | — | — | — | — | — | 5.61 | 5.61 | 5.61 | 6.64 | 7.66 | 8.68 | 8.68 | 8.68 | 9.71 | 5.61 |
| | Catalyst (g) | — | — | — | — | — | 19.35 | 19.75 | 19.75 | 19.75 | 20.35 | 19.75 | 19.75 | 21.25 | 19.75 | 19.75 |
| | Temperature (° C.) | — | — | — | — | — | 55 | 60 | 60 | 60 | 60 | 60 | 65 | 65 | 70 | 60 |
| | Time (hour) | — | — | — | — | — | 2 | 2 | 3 | 2 | 2 | 3 | 2 | 3 | 4 | 2 |
| Imidization ratio (%) | | 0 | 0 | 0 | 0 | 0 | 25 | 37 | 43 | 51 | 63 | 73 | 84 | 93 | 100 | 39 | a-1: pyromellitic dianhydride
a-2: 1,2,3,4-cyclobutane tetracarboxylic dianhydride
a-3: 3,6-bis(trifluoromethyl)-1,2,4,5-pyromellitic dianhydride
a-4: 3,3',4,4'-diphenyl tetracarboxylic dianhydride
a-5: 3,3',4,4'-dicyclohexyl tetracarboxylic dianhydride
b-1: p-diaminobenzene
b-2: 4,4'-diaminodiphenyl ether
b-3: 4,4'-diaminodiphenyl methane
b-4: 4,4'-diaminobiphenyl
b-5: 2,2'-bis(trifluoromethyl)-4,4'-benzidine
b-6: 1,4-diaminocyclohexane
b-7: 1,3-bis(4-aminobutyl)-1,1,3,3-tetramethyl disiloxane

TABLE 2

| Components (parts by weight) | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Polymer (A) | A-1-1 | 100 | | | | | | | | | | | | | |
| | A-1-2 | | 100 | | | | | | | | | | | | |
| | A-1-3 | | | 100 | | | | | | | | | | | |
| | A-1-4 | | | | 100 | | | | | | | | | | |
| | A-1-5 | | | | | 100 | | | | | | | | | |
| | A-2-1 | | | | | | 100 | | | | | | | | |
| | A-2-2 | | | | | | | 100 | | | | | | | |
| | A-2-3 | | | | | | | | 100 | | | | | | |
| | A-2-4 | | | | | | | | | 100 | | | | | |
| | A-2-5 | | | | | | | | | | 100 | | | | |
| | A-2-6 | | | | | | | | | | | 100 | | | |
| | A-2-7 | | | | | | | | | | | | 100 | | |
| | A-2-8 | | | | | | | | | | | | | 50 | |
| | A-2-9 | | | | | | | | | | | | | 50 | |
| | A-2-10 | | | | | | | | | | | | | | 100 |
| Inorganic oxide particle (B) | B-1 | 15 | | | | | | 10 | | 60 | | 50 | | | |
| | B-2 | | 25 | | 12 | | | | | 10 | | | | | 90 |
| | B-3 | | | 40 | | | 20 | | 50 | | | 50 | | 30 | |
| | B-4 | | | | | 20 | 10 | | | | 80 | | 20 | | |
| Silane compound containing an amino group (C) | C-1 | 1 | | | | 2 | | 8 | | | | 10 | | | 0.8 |
| | C-2 | | 0.5 | 5 | | 3 | | | 10 | 3 | | 5 | 4 | 2 | |
| | C-3 | | | | 3 | | 2 | | | | 12 | | | 2 | |
| Solvent (D) | D-1 | 400 | | | | 1000 | | 200 | | 2000 | 800 | 600 | 800 | | |
| | D-2 | | 600 | 800 | 800 | | | | 1500 | | 200 | | | 400 | 1200 |
| | D-3 | | | | 200 | | 700 | | | | | 400 | | 400 | |
| Compound (E) of Formula (I) | E-1 | | | | 1 | | | | | | | | | | |
| | E-2 | | | | | | | | | | | 3 | | 1 | |
| | E-3 | | | | | | | | 0.5 | | | | | 1 | |
| Evaluation Items | Transparency | ⊚ | ○ | ⊚ | ○ | ⊚ | ○ | ⊚ | ⊚ | ⊚ | ⊚ | ⊚ | ⊚ | ⊚ | ○ |
| | Thermal yellowing resistance | ○ | ○ | ○ | ⊚ | ○ | ○ | ○ | ⊚ | ⊚ | ⊚ | ⊚ | ⊚ | ⊚ | ○ |

TABLE 3

| Components (parts by weight) | | Comparative Examples | | | | | | | |
|---|---|---|---|---|---|---|---|---|---|
| | | 1 | 2 | 3 | 4 | 5 | 6 | 7 | 8 |
| Polymer (A) | A-1-1 | 100 | | | | | | | |
| | A-1-2 | | 100 | | | | | | |
| | A-1-3 | | | 100 | | | | | |
| | A-1-4 | | | | 100 | | | | |
| | A-1-5 | | | | | | | | 100 |
| | A-2-1 | | | | | | 100 | | |
| | A-2-2 | | | | | | | | |
| | A-2-3 | | | | | | | 100 | |
| | A-2-4 | | | | | | | | |
| | A-2-5 | | | | | | | | |
| | A-2-6 | | | | | | | | 100 |
| | A-2-7 | | | | | | | | |
| | A-2-8 | | | | | | | | |
| | A-2-9 | | | | | | | | |
| | A-2-10 | | | | | | | | |
| Inorganic oxide particle (B) | B-1 | | | | | | | | |
| | B-2 | | 25 | | | | | | |
| | B-3 | | | | | | | | |
| | B-4 | | | | | | | | |
| Silane compound containing an amino group (C) | C-1 | 1 | | | | | | 10 | |
| | C-2 | | | | | | | 5 | |
| | C-3 | | | 3 | 2 | | | | |
| Solvent (D) | D-1 | 400 | | | | | | 600 | |
| | D-2 | | 600 | 800 | 800 | | 1500 | | |
| | D-3 | | | | 200 | 700 | | 400 | 600 |
| Compound (E) of Formula (I) | E-1 | | | | 1 | | | | |
| | E-2 | | | | | | | 3 | |
| | E-3 | | | | | | 0.5 | | |

TABLE 3-continued

| Components | | Comparative Examples | | | | | | | |
|---|---|---|---|---|---|---|---|---|---|
| (parts by weight) | | 1 | 2 | 3 | 4 | 5 | 6 | 7 | 8 |
| Evaluation Items | Transparency | ○ | ○ | ○ | ○ | ○ | ○ | ○ | ○ |
| | Thermal yellowing resistance | X | X | X | X | X | X | X | X |

B-1: silicon dioxide with averaged diameter of 12 nm (IPA-ST, manufactured by Nissan Chemical Industries, Ltd.)
B-2: silicon dioxide with averaged diameter of 60 nm (OSCAR 105, manufactured by JGC CORPORATION)
B-3: titanium dioxide with averaged diameter of 10 nm (MT-05, manufactured by TAYCA Co., Ltd.)
B-4: zirconium dioxide with averaged diameter of 20 nm (OPTOLAKE TR-554, manufactured by JGC CORPORATION)
C-1: N-2-(aminoethyl)-3-aminopropyl trimethoxysilane
C-2: 3-aminopropyl triethoxysilane
C-3: N-phenyl-3-aminopropylmethyl dimethoxysilane
D-1: N-methyl-2-pyrrolidone
D-2: ethylene glycol n-butyl ether
D-3: N,N-dimethylethanamide
E-1: 1,3-bis(3-aminopropyl)-1,1,3,3-tetraphenyl disiloxane
E-2: 1,5-bis(3-aminopropyl)-1,3,3,5-tetraphenyl-1,5-dimethyl trisiloxane
E-3: 1,3-bis(3-aminopropyl)-1,1,3,3-tetramethyl disiloxane

What is claimed is:

1. A composition for flexible substrate, comprising:
a polymer (A) selected from the group consisting of polyamic acid resin, polyimide resin and any combination thereof, wherein an imidization ratio of the polyimide resin is 50% to 93%, the polymer (A) is obtained by reacting a mixture that includes a tetracarboxylic dianhydride component and a diamine component, the tetracarboxylic dianhydride component at least includes bicyclic alicyclic tetracarboxylic dianhydride compound, and the bicyclic alicyclic tetracarboxylic dianhydride compound has a tetravalent bridged hydrocarbon group with 7 to 9 of the total carbon atom number;
an inorganic oxide particle (B);
a silane compound containing an amino group (C);
a solvent (D); and
a compound (E) of Formula (I):

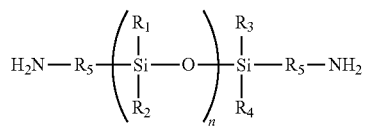

(I)

wherein the $R_1$, the $R_2$, the $R_3$ and the $R_4$ are the same or different monovalent hydrocarbon group(s); a plurality of the $R_5$ are the same or different divalent hydrocarbon group(s); and the n represents an integer of 1 to 10, and wherein based on a usage amount of the polymer (A) as 100 parts by weight, a usage amount of the compound (E) is 0.1 parts by weight to 3 parts by weight.

2. The composition for flexible substrate of claim 1, wherein an averaged diameter of the inorganic oxide particle (B) is 3 nanometers (nm) to 30 nm.

3. The composition for flexible substrate of claim 1, wherein based on a usage amount of the polymer (A) as 100 parts by weight, a usage amount of the inorganic oxide particle (B) is 10 parts by weight to 100 parts by weight, a usage amount of the silane compound containing an amino group (C) is 0.5 parts by weight to 15 parts by weight, and a usage amount of the solvent (D) is 200 parts by weight to 2000 parts by weight.

4. A flexible substrate made by the composition for flexible substrate of claim 1.

5. The composition for flexible substrate of claim 1, wherein the tetracarboxylic dianhydride component includes the bicyclic alicyclic tetracarboxylic dianhydride compound and fluorine-containing tetracarboxylic dianhydride compound.

* * * * *